US007267044B1

(12) United States Patent
Klinger

(10) Patent No.: US 7,267,044 B1
(45) Date of Patent: Sep. 11, 2007

(54) COMPACT ACTUATOR WITH LARGE THRUST

(76) Inventor: John Hamilton Klinger, 869 Contra Costa Ave., Berkeley, CA (US) 94707

( * ) Notice: Subject to any disclaimer, the term of this patent is extended or adjusted under 35 U.S.C. 154(b) by 71 days.

(21) Appl. No.: 11/355,596

(22) Filed: Feb. 16, 2006

Related U.S. Application Data

(60) Provisional application No. 60/657,682, filed on Mar. 1, 2005.

(51) Int. Cl.
*F01B 3/08* (2006.01)
*F16H 3/06* (2006.01)

(52) U.S. Cl. ........................... 92/136; 92/33; 74/89.25

(58) Field of Classification Search .............. 91/391 R; 92/31, 33, 136; 74/89.23, 89.25; 198/403
See application file for complete search history.

(56) References Cited

U.S. PATENT DOCUMENTS

| | | | | |
|---|---|---|---|---|
| 1,946,309 | A | 2/1934 | Coffman | |
| 2,225,790 | A | 12/1940 | Nardone | |
| 2,429,863 | A * | 10/1947 | Wright | 92/33 |
| 2,500,692 | A | 3/1950 | Martin | |
| 2,791,128 | A * | 5/1957 | Geyer et al. | 74/89.25 |
| 2,948,263 | A | 8/1960 | Royer | |
| 2,970,574 | A | 2/1961 | Geyer | |
| 3,133,476 | A * | 5/1964 | Geyer | 92/31 |
| 3,198,539 | A | 8/1965 | McMullen | |
| 3,213,923 | A | 10/1965 | Richter | |
| 3,255,806 | A | 6/1966 | Meyer | |
| 3,393,610 | A | 7/1968 | Aarvold | |
| 3,834,283 | A | 9/1974 | Beichel | |
| 3,989,223 | A | 11/1976 | Burkhardt | |
| 4,152,972 | A | 5/1979 | Fylling | |
| 4,300,641 | A | 11/1981 | Kinkel | |
| 4,313,367 | A | 2/1982 | Weyer | |
| 4,745,847 | A | 5/1988 | Voss | |
| 5,038,672 | A | 8/1991 | Beuschau | |
| 5,671,652 | A | 9/1997 | Weyer | |
| 6,247,390 | B1 | 6/2001 | Busch | |

FOREIGN PATENT DOCUMENTS

| | | |
|---|---|---|
| GB | 1132685 | 9/1968 |
| GB | 1311645 | 3/1978 |

* cited by examiner

*Primary Examiner*—Thomas E. Lazo

(57) ABSTRACT

A manually and/or fluid-pressure operated rotary actuator is coupled with a power screw in a compact assembly to produce large linear thrust. The actuator is operated in both directions by fluid pressure or in one direction by fluid pressure and in the other by spring energy, or by fluid pressure alone or in combination with manually applied force. The actuator has a cylindrical housing, a cylindrical reaction member inside of the housing, a cylindrical piston partially covering the reaction member, a cylindrical rotor partially covering the piston, a device forcing rotation of the piston when moving axially with respect to the reaction member and/or rotor, a plunger engaged with the rotor and restrained from turning with respect to the housing, a base through which the plunger extends, a spring connected to the rotor and housing, a two port assembly, and a handle affixed to the reaction member for manual operation.

3 Claims, 3 Drawing Sheets

COMPACT ACTUATOR WITH LARGE THRUST

CROSS REFERENCE TO RELATED APPLICATIONS

This invention claims the benefit of PPA Ser. No. 60/657,682, filed 2005 Mar., 01 by the present inventor.

BACKGROUND OF THE INVENTION

1. Field of Invention

This invention relates to a fluid-pressure powered actuator of small diameter producing large thrust, used to operate valves, brakes, and various articulated mechanisms.

2. Prior Art

Actuators powered by pneumatic or hydraulic pressure are the preferred means of remotely operating mechanical devices where the possibility of electrical shock, spark, or electromagnetic interference is too high.

When linear thrust is needed to operate some device, such as the poppet in a valve, actuators are used which vary in construction and complexity, ranging from a single piston in a closed cylinder directly coupled with an output member to more elaborate arrangements of levers and cams coupling a piston or bladder with an output member. Minimizing the cost usually argues for the simplest, single piston actuators, but occasions arise when the thrust needed to operate the device is greater and the space available for an actuator is restricted.

The thrust produced in a single piston is the product of its area projected in the direction of its linear motion and the pressure of the fluid, so when greater thrust is needed from a simple piston actuator, either the piston diameter or fluid pressure must be increased. Delivering greater fluid pressure to the actuator is not always a preferred option because it requires a stronger pump to produce it and heavier conduits to deliver it; greater pressure also carries greater risk of injury or damage from accidental fluid releases. When room is limited or has high overhead cost, as in clean rooms and other tightly controlled environments, increasing the piston diameter is also not preferred and other ways are sought to increase the actuator's output thrust.

One simple option is to gang together two or more pistons to increase the effective piston area; for practical considerations, this type uses three pistons in series at most and, because of effective area lost to the rods which connect the pistons, the resultant output force is less than 2.85 times that of a single piston actuator or the same diameter.

Another option to increase output thrust is an "oil-filled" actuator which uses a primary piston to drive a much smaller piston which pushes against a fixed volume of incompressible fluid, typically a hydraulic oil, which in turn pushes against a piston similar in diameter to the first piston; this arrangement essentially produces an internal fluid pressure much higher than that delivered to the actuator, resulting in a higher output thrust. Unlike actuators where the output member is directly coupled with the pistons driven by the remotely delivered fluid, "oil-filled" actuators have output member movements only a fraction of the first piston's movement, requiring longer overall actuator assembly length for a given output movement requirement, but this is seldom an important issue. These can provide very high actuation force without increasing the basic actuator diameter, but, because the higher internal fluid pressure increases the chance of gasket failure, this type of actuator carries a contamination or fire risk from leakage of its internally held fluid and is not preferred in environments such as semiconductor fabrication or pharmaceutical production facilities. This type of actuator can self-actuate due to thermal expansion of the internally held fluid with increasing temperatures if the actuator's assembly does not leave the first piston adequate back clearance to accommodate the expansion, or may act sluggishly at low temperatures, for which reason it is not preferred when operating temperatures can fluctuate widely.

Another option is a linear actuator which amplifies the thrust of its piston with sets of rollers against cam levers or more elaborate linkages, increasing the output thrust without appreciable increase in piston size, fluid pressure, or use of internally held fluids. These kinds of actuators have a minimum of five or six moving parts, compared with one or two in a simple piston actuator or two or three in a fluid-filled actuator, making them more troublesome to assemble and maintain. Scaling these designs down to smaller sizes (4 cm in diameter or less) is difficult because the areas of concentrated bearing and shear stress mean in these moving parts prevents them from being scaled down proportionally. These areas of concentrated stress are also subject to greater rates of wear, and these kinds of actuators are not preferred where maintenance actions carry a high overhead cost.

The oldest and simplest method of producing high linear motion and force in a relatively compact machine is with the power screw, in which an axially constrained nut with female threads is rotated to produce axial thrust in a rotationally constrained rod engaging it with male threads, or visa versa. This mechanism has been and is still used to operate every manner of device, especially valves, with rotation and torque imparted to the nut (or rod) by hand, by draught animals, with internal combustion engines, with electric motors, and anything else capable of exerting torque or tangential force on a lever arm.

Pneumatic and hydraulic rotary actuators are widely used with the object of generating rotation and torque for the operation of valves and various pivoting mechanisms, and come in a variety of constructions.

The simplest rotary actuators have one or more fluid-driven pistons arranged perpendicularly to the axis of an output shaft imparting torque and rotation through rack and pinion engagement with the shaft. These are commonly used to operate gate valves, but the lateral arrangement of their pistons makes them bulky.

Another type of rotary actuator features a chamber in the form of a partial annulus centered on the output shaft and a radial fin attached to the output shaft to divide the chamber in two parts. This type is also bulky.

A more elaborate kind of rotary actuator uses a piston in form of an annulus which engages a fixed housing and an output shaft by the means of helical splines or cam slots. This type of rotary actuator is more compact because the piston is coaxial with the output shaft, and is used in applications where the room available for an actuator is limited.

BACKGROUND OF INVENTION—OBJECTS AND ADVANTAGES

Several objects of this invention are to offer a linear actuator with increased the output thrust without increasing the operating fluid pressure or actuator diameter, without internally held fluids to present contamination or fire hazards and restrict operating temperature range, with fewer points of concentrated stress and wear, and which will not be operated in reverse by the device which it is meant to operate. Another significant object of this invention is to combine manual operation with fluid-power operation with little increase in diameter, and to permit this combination in logical configurations such as “AND” and “OR”.

Maintaining a small diameter allows devices incorporating the present invention to be located in constrained spaces, such as wheel-mounted brake assemblies, bore hole and pipe line service devices, air foil structures, and robotic assemblages where space is constrained by functional issues. In semiconductor fabrication and biotechnology tools where space has a high overhead cost and contamination is more costly, valves incorporating the present invention would be preferred over those incorporating larger actuators and actuators with internally held fluids.

One embodiment of this invention permits the combination of both manual and pneumatic operation of a gas cylinder valve of a size small enough to fit within standard cylinder valve protectors; in its logical “AND” configuration, fluid-power (remote) operation would not be enabled before the device was manually turned to “ON” or “ENABLE” at the gas cylinder, and could be manually turned to “OFF” or “DISABLE” in emergencies; in its logical “OR” configuration operation could be either with fluid-power (remotely) or manual. Because gas storage cylinders are often situated where temperatures range over 60 degrees Celsius, this embodiment of the present invention is preferred over actuators with internally held fluids.

An advantage of all embodiments of the present invention is that no amount of force against its output thrust member will induce reverse operation of the actuator, and in double-acting embodiments, where there is fluid-pressure-operated in both directions, the output member is stopped and held at any point when fluid pressure is removed from both fluid ports.

SUMMARY

The present invention provides a fluid-pressure-operated rotary actuator coupled with a power screw in a compact design which produces a large output thrust when operated at modest fluid pressure, and is constructed such that manual operation of the actuator can be combined with fluid-powered operation in a simple compact design.

This invention therefore comprises a hydraulically- or pneumatically-operated actuator comprised of a housing 10 and a reaction member 24 rigidly affixed coaxially inside its closed end, and a base 18, these items enclosing three moving bodies of a piston 12, a rotor 14, and a plunger 16, such that the cup-like piston 12 slides closely over and partially covers the reaction member 24 engaging it by helical splines or threads 34 & 52 and fits closely inside the housing’s smaller bore 42 against which it makes a fluid-tight seal 100 dividing the volume within the housing 10 and base 18 into two parts, the cup-like rotor 14 is closely guided inside the housing’s larger bore 44 and into which the piston 12 slides closely, partially covering it, engaging it by helical splines or threads 54 & 62, the plunger 16 with male threads 72 at one end which engage female threads 64 at the closed end of the rotor 14, an extension 76 which extrudes through the end of the base 18 and one or more flats 74 on the perimeter of its middle portion which bear against a pin 92 installed cross-wise in the base 18 preventing rotation of the plunger 16.

In accordance with the present invention, the actuator is constructed so that fluid delivered through the reaction member 24 to the volume between it and the piston 12 impels the piston 12 to move axially in the housing’s smaller bore 42 and rotating with respect to the reaction member 24 as it does so as constrained by their helical splines 34 & 52; as the piston 12 slides into the rotor 14, which may rotate but not move axially, the rotor 14 rotates with respect to the piston 12, so that its rotation with respect to the housing 10 and base 18 is the sum of its rotation with respect to the piston 12 and the piston’s 12 rotation with respect to the reaction member 24; as the rotor 14 turns, its female threads 64 engage the plunger’s male threads 72 to produce axial thrust and motion of the plunger 16 which is prevented from turning by the pin 92.

In accordance with the present invention, the actuator may be double-acting, where fluid may also be delivered to the volume between the piston 12 and the base 18, resulting in reversal of the actions just described, or the actuator may single-acting, where a power spring 150 connected to the rotor boss 66A and a lock ring 140 which is affixed to the housing 10 provides torque to reverse the rotation of the rotor 14 and drive the piston 12 back to its original position when fluid is released from the volume between the piston 12 and reaction member 24. In either embodiment, the direction in which the plunger 16 moves can be controlled by choice of the direction of the rotor and plunger threads 64 & 72.

In accordance with the present invention, the actuator may combine manual operation with the fluid-powered operation just described by replacing the rigidly affixed reaction member 24 with a reaction member 24B having an extension passing through the closed end of the housing 10B to which a handle 180 is attached, such that manually turning the handle 180 turns the reaction member 24B, the piston 12, and rotor 14, while fluid may still be delivered through a coaxial port 160B through the center of the reaction member 24B to effect movement of the piston 12 as previously described. In this embodiment, the plunger’s output extension 76 can be designed to fall short of effective contact with the device being operated by the actuator unless the rotor 14 is driven by both fluid-powered movement of the piston 12 and by rotation of the handle 180, which constitutes the logical “AND” function; conversely, the plunger’s output extension 76 can be designed to always be in effective contact, so that either fluid-powered movement of the piston 12 or rotation of the handle 180 operates the device, constituting the logical “OR” function.

In accordance with the present invention, all embodiments operate such that output movement of the plunger 16 is produced only by the application of fluid pressure or turning the handle 180, and will never by produced by force originating from the device being operated by the actuator.

DRAWINGS—FIGURES

DRAWINGS—REFERENCE NUMERALS

Figure 1A:
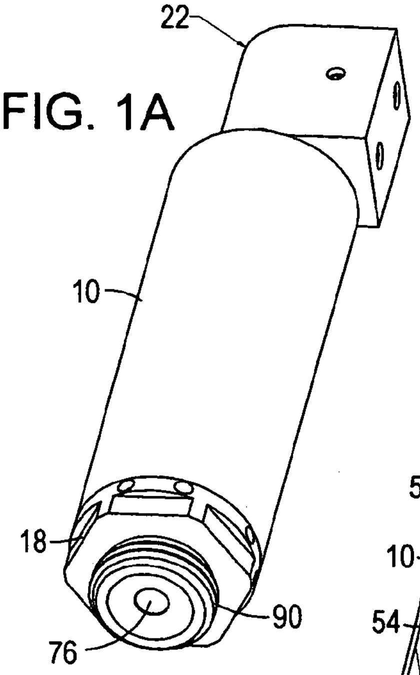
FIG. 1A shows a perspective view of the invention in its main embodiment, a double-acting actuator.
Figure 1B:
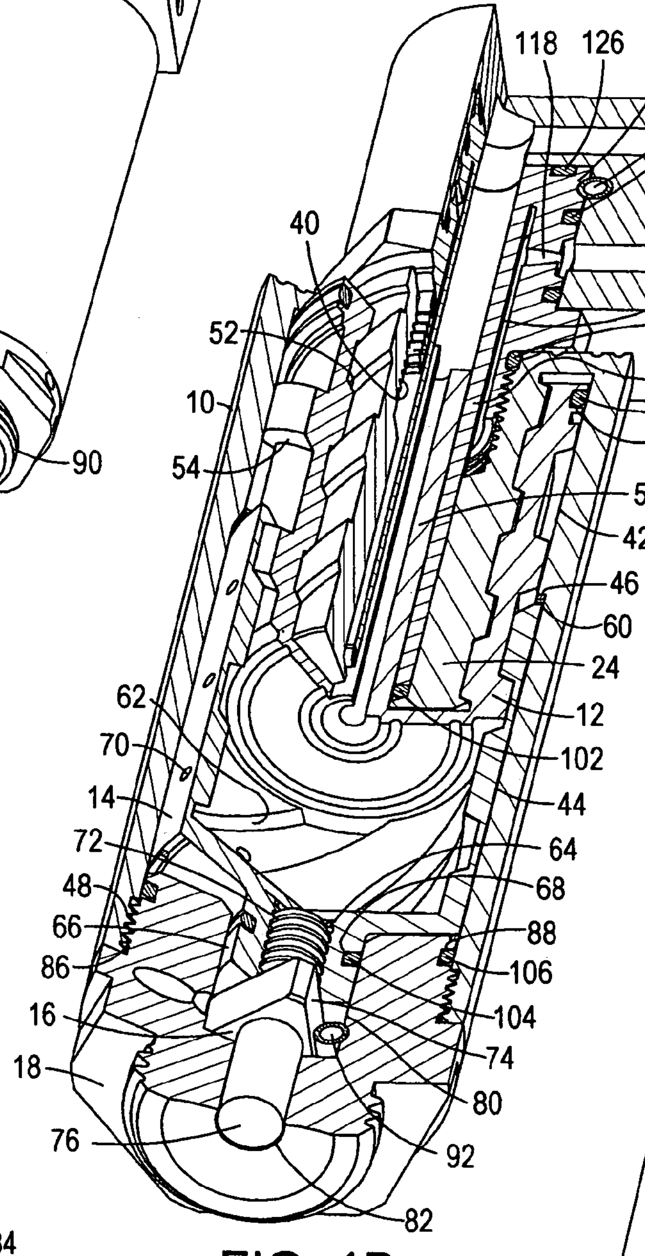
FIG. 1B shows the invention in its main embodiment in a perspective view with partial section along its main axis.
Figure 1C:
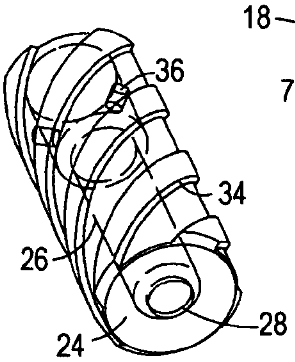
FIG. 1C shows the isolated Reaction Member component of the invention in its main embodiment in perspective view.
Figure 1D:
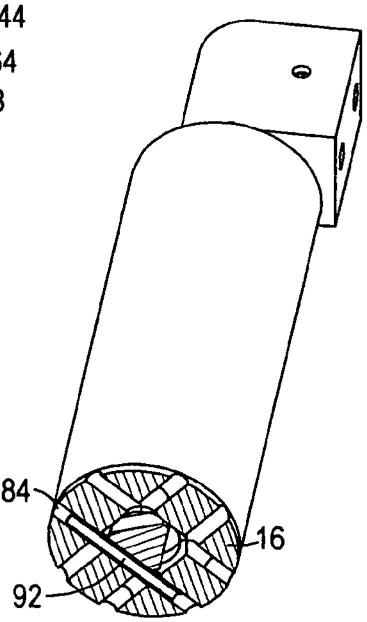
FIG. 1D shows the invention in a perspective view of a partial section through the plane of the anti-rotation pin and normal to the invention’s main axis.
Figure 2A:
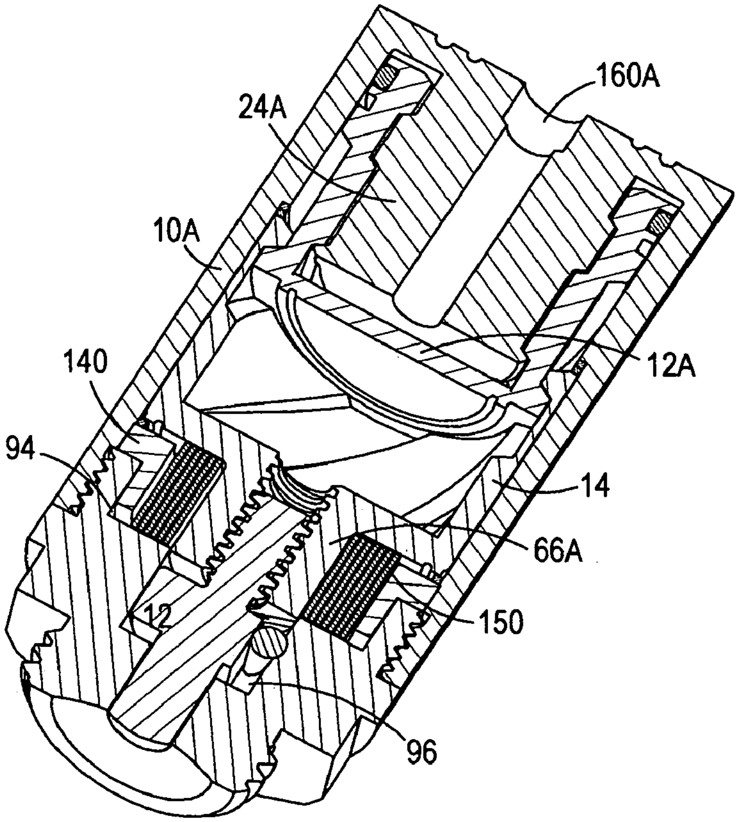
FIG. 2A shows the invention in an alternative embodiment, a single-acting actuator, in a perspective view of a partial section along its main axis.
Figure 2B:
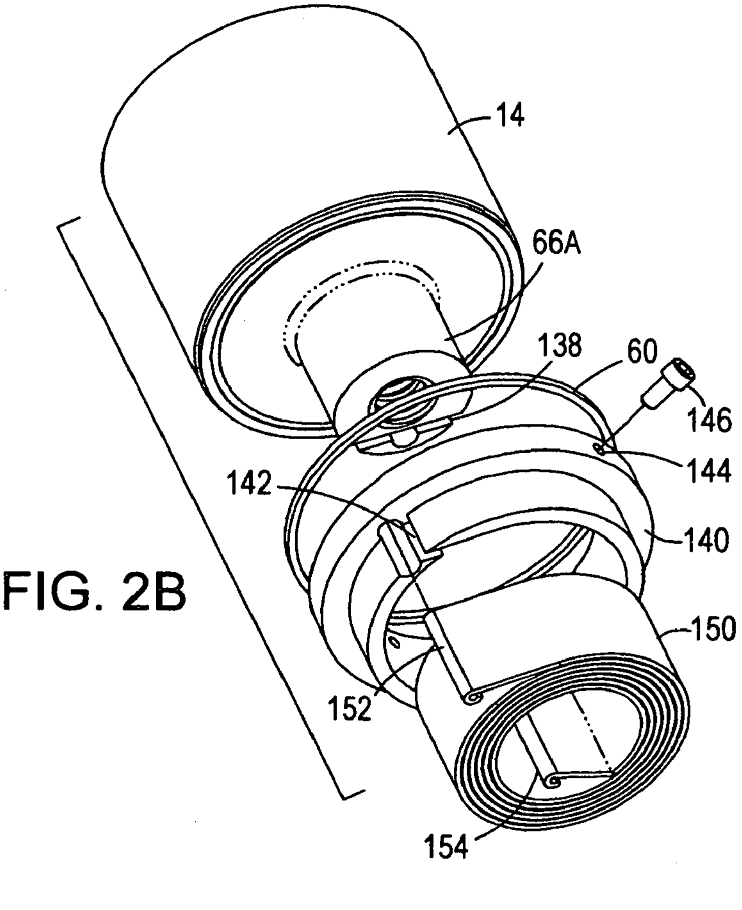
FIG. 2B show a partial exploded view of the rotor, thrust ring, locking ring, and power spring of the same embodiment.
Figure 3A:
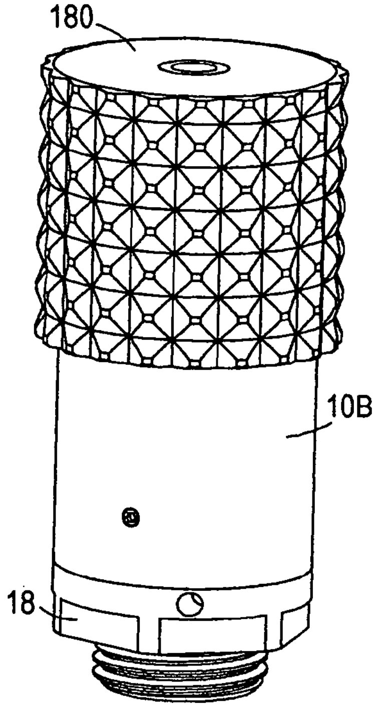
FIG. 3A shows the invention in a second alternate embodiment, an actuator combining manual and single-acting fluid-power operation, in a perspective view.
Figure 3C:
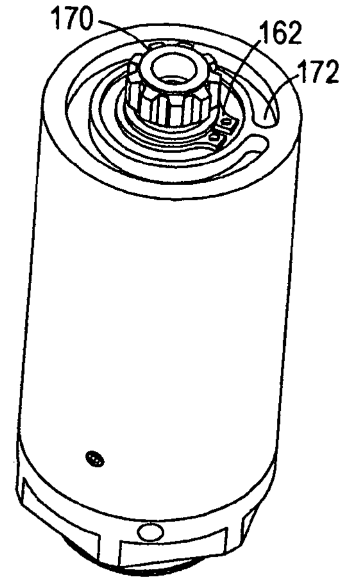
FIG. 3C shows a perspective view of the same embodiment with its handle removed.
Figure 3B:
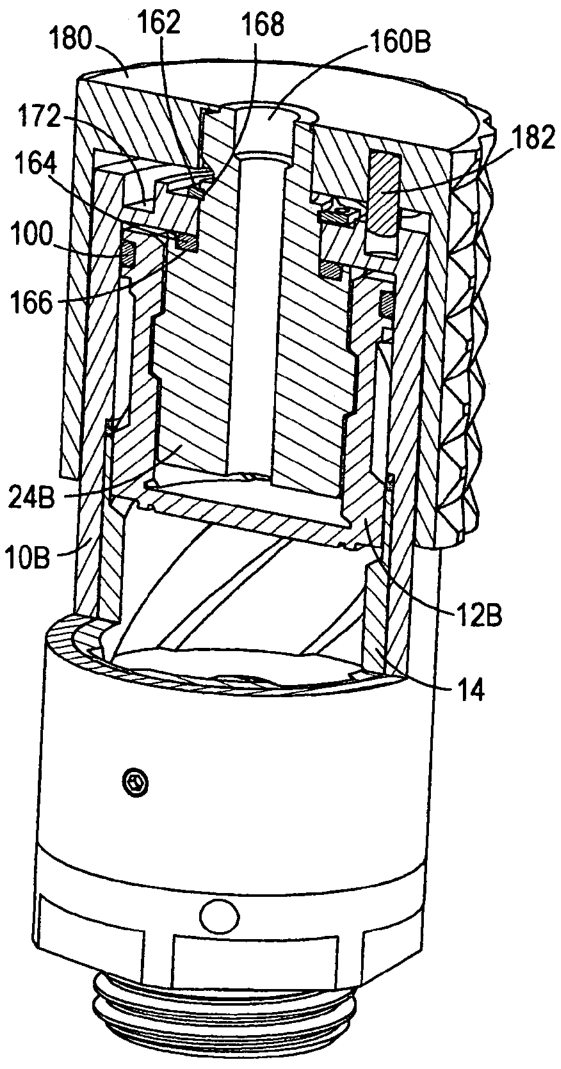
FIG. 3B shows a perspective view of a partial section through the upper portion of the same embodiment, along its main axis.

| | | | |
|---|---|---|---|
| FIGS. 1A through 1D | | | |
| 10 | Cylinder Housing | 12 | Piston |
| 14 | Rotor | 16 | Plunger |
| 18 | Base | 22 | Port Assembly |
| 24 | Reaction Member | 26 | Reaction Member Bore |
| 28 | Pilot Hole | 34 | Helical Spline |
| 36 | Cross Hole | 40 | Threaded Port |
| 42 | Smaller Bore | 44 | Larger Bore |
| 46 | Bore Shoulder | 48 | Female Threads |
| 50 | Piston Tube | 52 | Internal Helical Spline |
| 54 | External Helical Spline | 56 | Piston O-Ring Gland |
| 60 | Thrust Ring | 62 | Helical Spline |
| 64 | Female Threads | 66 | Rotor Boss |
| 68 | Rotor O-Ring Gland | 70 | Rotor Vent Hole |
| 72 | Plunger Male Threads | 74 | Plunger Flat Face |
| 76 | Plunger Output Extension | 80 | Base Counter-bore |
| 82 | Base Bore | 84 | Base Cross Hole |
| 86 | Base Assembly Threads | 88 | Base O-Ring Gland |
| 90 | Base Mounting Threads | 92 | Anti-Rotation Pin |
| 100 | Piston O-Ring | 102 | Piston Port O-Ring |
| 104 | Rotor O-Ring | 106 | Base O-Ring |
| 110 | Port Body | 112 | Port Tube |
| 114 | Port O-Ring | 116 | Port Annular Space |
| 118 | Port Cross Hole | 120 | Port Swivel Head |
| 122 | "Up" Port Connection | 124 | "Down" Port Connection |
| 126 | "Up" Port O-Ring | 128 | "Down" Port O-Ring |
| 130 | Swivel Pin | | |
| FIGS. 2A and 2B | | | |
| 10A | Housing | 12A | Piston |
| 14 | Rotor | 24A | Reaction Member |
| 60 | Thrust Ring | 66A | Rotor Boss |
| 94 | Large Counter-bore | 96 | Small Counter-bore |
| 138 | Rotor Boss Spring Slot | 140 | Lock Ring |
| 142 | Lock Ring Slot | 144 | Tapped Hole |
| 146 | Screw | 150 | Power Spring |
| 152 | Power Spring Outboard Tab | 154 | Power Spring Inboard Tab |
| 160A | Port Connection | | |
| FIGS. 3A through 3C | | | |
| 10B | Cylinder Housing | 12B | Piston |
| 14 | Rotor | 24B | Rotating Reaction Member |
| 100 | Piston O-Ring | 160B | Port Connection |
| 162 | Retaining Ring | 164 | Reaction Member O-Ring |
| 168 | Retaining Ring Groove | 170 | Straight Spline |
| 172 | Slot | 180 | Handle |
| 182 | Handle Pin | | |

DETAILED DESCRIPTION—FIGS. 1A THROUGH 1D—MAIN EMBODIMENT

A main embodiment of the present invention is a double-acting actuator as illustrated in FIGS. 1A (a perspective view), 1B (a perspective partial length-wise sectional view), 1C (a perspective view of the reaction member in isolation) and FIG. 1D (cross-section perpendicular to actuator axis in plane of the anti-rotation Pin 92).

A cylindrical housing 10 and base 18 enclose all active components of the actuator of this invention, as pictured in FIG. 1A, and its external interfaces consist of a port assembly 22 to which fluid-power is delivered, base mounting threads 90 which attach the actuator to the device it operates, and a plunger extension 76 which transmits force and movement to active element of the device being operated.

Wholly within the housing 10 are a piston 12 and a rotor 14, together with the various sealing gaskets associated with them and thrust rings 60, while partially within the housing 10 are the port assembly 22 and plunger 16 (whose extension 76 penetrates the base 18 as noted above).

The housing 10 has bores of two diameters, a smaller bore 42 and larger bore 44, separated by a small shoulder 46. The housing 10 has a closed end from which a coaxial reaction member 24 extends beyond the length of the smaller bore 42 and partly through the length of the larger bore 44. This reaction member has a coaxial threaded port 40, cross holes 36 which connect the port 40 with the reaction member's 24 exterior, a bore 26 smaller than the threaded port 40, and a pilot hole 28 through the free end of the reaction member 24. The reaction member 24 also has a helical spline or threads 24 on its outer surface. FIG. 1B shows the reaction member 24 as an integral part of the housing 10, but a preferred embodiment would be to fabricate the reaction member 24 and balance of the housing 10 as separate pieces to be welded together in a rigid assembly. The open end of the housing 10 has female threads 48 for the attachment of the base 18.

The piston 12 is a cylindrical shell closed at one end such that it partially covers the reaction member 24 and is closely guided between the reaction member 24 and the cylinder's smaller bore 42. The piston 12 has a gland 56 for an O-ring 100 or other kind of gasket at its open end, such that a fluid-tight seal may be formed between the piston 12 and smaller bore 42, dividing the volume enclosed by the housing 10 and base 18 into two volumes. Affixed to the closed end of the piston 12 is a tube 50 which extends back approximately through the full length of the piston 12, passing closely but freely through the pilot hole 28 in the end of the reaction member 24. The piston 12 has a helical spline or threads 52 on the full length of the inner surface of its wall which are conjugal to the portion with one or more flats 74 on its perimeter. Using three or more flats 74 is preferred to provide smaller increments for axial adjustment of the plunger 16 with respect to the rotor 14 during assembly by turning the plunger 16 one way or the other before installing the anti-rotation pin 92.

The base 18 has male threads 86 at one end for attachment to the housing 10, and a gland 88 for an O-ring 106 or other kind of gasket to form a seal between base 18 and housing 10. The base 18 has a bore 82 all the way through its length, which closely guides the plunger extension 76, and a counter-bore 80 which guides the rotor boss 66 and plunger's 16 middle portion and offers a surface against which the rotor boss O-ring 104 forms a fluid-tight seal. The base 18 has cross holes 84 into which an anti-rotation pin 92 may be pressed and which are perpendicular to the base axis and offset from intersecting that axis such that the pin 92 is tangent to one of the plunger flats 72 when the flat 72 is parallel with the cross hole 84. FIG. 1D shows a preferred embodiment with four cross holes 84 which, in concert with three plunger flats 74, lets the angular orientation of the plunger 12 to be set in increments of one twelfth of the plunger thread's pitch.

The rotor 14, plunger 16, and anti-rotation pin 92 set in the base 18 comprise a power screw.

Compressive force on the plunger extension 76 from the device being operated by the actuator is transmitted up through the plunger and rotor threads 72 & 64 and rotor 14 to the housing 10 through one or more thrust rings 60 seated in the housing bore shoulder 46. These rings reduce resistance to rotation of the rotor 14 when it is under axial compression. Balanced against this compressive force is the tensile force from the housing bore shoulder 46 through the wall of the larger bore 44, the housing and base threads 48 and 86, the base 18 and mounting threads 90 back to the device being operated. Accordingly, the various tensile and compressive members of the actuator must be design with adequate strengths.

The port assembly 22, as shown in FIG. 1B, consists of a body 110, a tube 112, a swivel head 120, and several O-rings or other kinds of gaskets and a pin 130 for retaining the swivel head 120. The port body 110 has threads which mate with those in the threaded port 40 in the reaction member 24, and glands for an "Up" port O-ring 126, two "Down" port O-rings 128, and Port O-ring 114. The port tube 112, which slides easily in the bore 26 in the reaction member 24, is rigidly affixed to the port body 110 at one end and extends through the body 110 and well beyond it; the tube 114 has a bore the into which the piston tube 50 slides easily. The port body 110 has a counter-bore part of its length which, with the port tube 112 extending through it coaxially, forms an annular clearance 116; cross holes 118 communicate between the annular clearance 116 and the outside of the port body 10 between the two "Down" O-rings 128. The free end of the port tube 112, together with the reaction member bore 26 and piston tube 50, captures the piston port o-ring 102 or other kind of gasket when the port assembly 22 is installed. The swivel head 120 has two fluid connections, the "Up" port connection 122, through which fluid is delivered to the port tube's 112 central bore, and the "Down" port connection 124, through which fluid is delivered to the port's cross holes 118 and annular clearance 116. The port body 110 has a groove on its diameter and the swivel head 120 has a cross hole such that a pin 130 pressed into the cross hole is held tangent to the groove allowing the swivel head 120 to turn but preventing if from separating from the port body 110. A simpler embodiment would be to eliminate the swivel head 120 and the features such as O-rings associated with it, instead having a single "Up" port connection in a smaller port-body/tube piece (the tube is still preferred to capture the piston port O-ring 102), and a second single "Down" port connection in the end face of the housing 10 located between the housing's smaller bore 42 and the reaction member 24. Such an embodiment may leave too little room for commercially available fluid line connectors; a port assembly with a swivel head 120, as shown, alleviates this crowding and makes it easier to attach and maintain conduits for delivery of fluids to the actuator.

FIGS. 1B and 1C show a four-start helical spline for reaction member 24, piston 12, and rotor 14 as could be fabricated by machining or molding, but other embodiments may use high-lead multi-start "Vee" threads or matching helical grooves on both conjugal parts with helical segments of another material between them, or even helical slots on one piece and a pin, roller bearing, or key affixed to the other piece. Embodiments of the invention with more continuous contact between mating spline or threads have the advantage of lower contact stresses and localized wear over embodiments with more localized contact stresses. These features may be cut by machine, cast, molded, or pressure-formed in thin-walled pieces to be subsequently brazed or welded together. The helical spline or threads must have large enough pitches that they are not self-locking, so that friction does not prevent the conjugal parts from sliding and rotating with respect to one another when axial force is applied. At the same time, the rotor boss-plunger threads 64 & 72 should have a small enough pitch so that it is self-locking and friction prevents rotation with respect to one another when axial force is applied.

OPERATION—FIGS. 1A THROUGH 1D—MAIN EMBODIMENT—FLUID OPERATION IN BOTH DIRECTIONS

The main embodiment of the present invention produces axial movement of the plunger extension 76 in one direction when fluid pressure is applied to the "Down" port connection 124, and axial movement in the other direction when fluid is delivered under pressure to the "Up" port connection 122.

Admission of the fluid to the volume between piston 12 and reaction member 24 through the "Down" port connection 124, port cross holes 118, port's annular space 114, and reaction member cross holes 36 subjects the piston 12 to the fluid's pressure such that it is impelled to move axially away from the reaction member 24; the piston 12 is guided by the smaller cylinder bore 42, and rotates as it moves axially as constrained to do so by the engagement of its internal helical spline 52 with the reaction member's helical spline 34.

As the piston 12 slides off of the reaction member 24, it slides into the rotor 14, which is constrained from axial movement by the thrust rings 60 and base 18, and which rotates in the housing's larger bore 44 with respect to the piston 12 as it is constrained to do by its helical spline 62 engaging the piston's external helical spline 54. The rotation of the rotor 14 with respect to the housing 10 is the sum of its rotation with respect to the piston 12 and rotation of the piston 12 with respect to the reaction member 24, converting air or hydraulic fluid power to rotary motion and torque. The amount of rotation is determined by the pitches of the two helical spline and by the length of the piston's 12 axial travel; the torque is determined by the fluid force on the piston (the product of the piston's effective area and the fluid's pressure), mean diameters of the two helical spline, the pitch of the two helical spline, and by the friction between the various moving parts.

As the rotor 14 turns, its female threads 64 drive against the plunger's male threads 72, and because the plunger 16 is restrained from rotating by the anti-rotation pin 92 bearing on the plunger flat 74, the plunger 16 is constrained to move axially, converting the rotation and torque of the rotor 14 to linear motion and thrust in the plunger 16, as in a power screw.

Alternately, admission of fluid to the volume between the piston 12 and base 18 through the "Up" port connection 122, port tube 112, and piston tube 50 subjects the piston's 12 other surfaces to the fluid's pressure such that it is impelled back towards the reaction member 24; the piston 12 is guided and constrained to move as before but in the opposite direction. Likewise, the rotor 14 and plunger 16 are constrained to move as before but in the opposite directions, effectively returning the actuator assembly to its original condition.

For the actuator to operate in either axial direction fluid must be allowed to exit the unused port connection freely; for example, fluid must be allowed to exit the "Up" port connection 122 when supplying fluid at elevated pressure to the "Down" port connection 124, and visa versa. The rotor vent holes 70 provide paths for fluid to exit (and enter) the volume between the rotor 14 and base 18 with less restriction.

As an example of the advantage of coupling a power screw to this rotary-actuator, assume for the rotary actuator a housing 10 with outer diameter of 3.5 cm (1.37 in.) and smaller bore diameter 42 of 2.87 cm (1.13 in.): The piston 12 would experience axial thrust of approximately 43 kg-force (95 lbf) when supplied with air at 6.9 Bar (100 psig); further assume a mean diameter of 2.03 cm and pitch of 63.5 cm (2.5 inches) for the reaction member/piston helical spline set, and a mean diameter of 264 cm (1.05 in.) and pitch of 84.67 cm (3.333 inches) for the piston/rotor helical spline set: The rotor would develop a torque of about 6.0 kN-cm (61 inch-pounds) with typical lubricant applied the sliding surfaces. Assume the rotor/plunger threads are M6.35×1.58 (or a standard ¼-16 ACME): the thrust imparted to the plunger would be over 499 kg-force (1,100 lbf). By contrast, a simple single piston linear actuator would develop an output thrust of 43 kg-force (95 lbf), and a three piston linear actuator would develop a thrust of about 122 kg-force (270 lbf).

The actuator can not be operated by force and movement originated in the device to which it is mounted because the rotor boss and plunger threads 64 & 72 are “self-locking”. This being the case, the plunger 16 can be stopped at any point of its total axial travel by releasing the fluid from both sides of the piston 12, which is not the case with simple piston-type actuators or cam-type or linkage-type.

DETAILED DESCRIPTION—FIGS. 2A AND 2B—SINGLE-ACTING EMBODIMENT

A single-acting embodiment of the present invention is illustrated in FIG. 2A (lengthwise cross-sectional view) and FIG. 2B (exploded partial view). This embodiment is the same as the main embodiment except for the following differences: There is but a single port connection 160A at the closed end of the housing and no port assembly, there is no piston tube nor piston port O-ring, there are no rotor vent holes, the rotor boss 66A is has no O-ring gland but does have a spring slot 138, there is a power spring 150, a lock ring 140, and the base has no O-ring gland but has a large counterbore 94 and small counterbore 96.

The power spring 150 is a reverse-spirally wound flat ribbon spring with an outboard tab 152 for engagement by the lock ring spring slot 142 and an inboard tab 154 for engagement by the rotor boss spring slot 138.

The lock ring 140 is a ring with a flange thick enough to accommodate two or more radial tapped holes 144 in the flange perimeter and of a diameter to fit inside the housing, of overall length and inside diameter sufficient to enclose the power spring 150, and of a minor outer diameter which is closely guided by the base large counterbore 94. It has a slot 142 tangential to its inside diameter.

The power spring 150 torque may be set, before attaching the base 18 to the housing 10A, by assembling the spring 150 over the rotor boss 66A with inboard tab 154 seated in the spring slot 138 and lock ring 140 over the spring 150 with the ring spring slot 142 seated over the outboard tab 152, then rotating the lock ring 140 until the required torque is reached, then aligning one of the tapped holes 144 with the closest corresponding hole in the housing and fixing the lock ring in place with a small screw 146.

Other types of springs may be used to store the energy needed to reset the actuator, including both compression and tension springs, but the embodiment shown in FIGS. 2A and 2B is preferred because the reverse-spirally-wound power spring 150 fits conveniently between rotor and base, is conveniently attached to other actuator parts, can be designed to provide torque with relatively small change as the rotor turns, and its set torque is easily adjusted.

The reaction member 24A, with no cross holes and a single hole through its length and potentially smaller fluid port 160A, is simpler than the reaction member 24 in the main embodiment.

OPERATION—FIGS. 2A AND 2B—SINGLE-ACTING EMBODIMENT

This embodiment of the present invention is meant to effect linear motion of the Plunger Output Extension 76 in one axial direction by supplying a fluid, such as air or hydraulic fluid, to the single Port Connection 160A, and have the Output Extension 76 return automatically to its original position when the fluid pressure is removed and the fluid allowed to exit the Port Connection 160A.

Fluid delivered to the volume between the reaction member 24A and piston 12A impels the axial movement of the piston 12A as in the main embodiment, and subsequent rotation of the piston 12A and rotor 14 as in the main embodiment. As the rotor 14 turns, it tightens the power spring 150 as well as driving the plunger’s axial movement.

When fluid is released from the volume between the reaction member 24A and piston 12A through the port connection 160A, the torque of the power spring 150 reverses the rotation of the rotor 14 and piston 12A; the piston 12A6 is constrained by the helical spline 52 to return to its initial axial position.

In this embodiment it is important that both helical spline sets or threads not be rotationally self-locking as well as not axially self-locking, otherwise the power spring 150 can not cause the piston 12A to be reset.

It can be seen that movement of the plunger 16 is active in one direction only when the fluid is delivered to the port connection 160A, and moves in the other direction automatically when the fluid is released back through the port connection 160A. If movement of the plunger 16 in the latter direction must be the active case, this can be obtained by using rotor boss and plunger threads 64 & 72 of the opposite sense than before, for example left-hand threads instead of right-hand threads.

DETAILED DESCRIPTION—FIGS. 3A THROUGH 3C—EMBODIMENT COMBINING MANUAL AND FLUID-POWERED OPERATION

The embodiment of the present invention illustrated in FIG. 3A (perspective view), FIG. 3B (perspective partial sectional view), and 1C (perspective view with handle removed) is a single-acting actuator combined with manual operation, but the differences described here may be applied to the main embodiment, too, realizing an actuator operated manually and by fluid pressure in both directions. For the sake of clarity the construction is taken to be the same as in the single-acting embodiment of the present invention described above with the exception of the housing 10B, reaction member 24B, and the addition of a retaining ring 162, a reaction member O-ring 164, a handle 180, and a handle pin 182.

The reaction member 24B is no longer rigidly attached to the housing 10B, but has an extension which protrudes through the closed end of the housing 10B; this extension has a groove 168 for a retaining ring 162 such that the reaction member 24B is held firmly against the inside surface of the closed end of the housing 10B but may turn with respect to the housing. The reaction member 24B also has a gland 166 for an O-ring 164 or other kind of gasket to provide a seal at the reaction member-housing union. As in the first single-acting embodiment, a simple hole through the full length of the reaction member is all that is needed, but the fluid port 160B may need to be larger to accommodate a swivel fluid connector. The reaction member's new extension terminates in a straight spline 170 for attachment of a handle 180.

The handle 180 is a cylindrical shell closed at one end. Its closed end has a coaxial hole with a spline matching reaction member spline 170, whereby it is attached to the reaction member 24B and partially covers the housing 10B. The handle is provided with an external material or texture to improve gripping during manual operation. It also has a pin 182 affixed inside the closed end off-center of the main axis but parallel to the main axis.

The closed end of the housing 10B has a slot making a partial arc centered on the reaction member axis; this slot is wide, deep enough, and set at the correct mean diameter for the handle pin 182 to move-through. Because it is not a complete arc, rotation of the handle 180 will be limited when the pin 182 reaches either end of the slot 172.

The handle 180 can be formed in a great variety of ways and attached to the reaction member 24B in other ways, but partially covering the housing 10B as illustrated in FIGS. 1A through 1C the handle 180 offers much gripping area while adding little additional length to the actuator assembly.

OPERATION—FIGS. 3A THROUGH 3C—EMBODIMENT COMBINING MANUAL AND FLUID-POWERED OPERATION

This embodiment of the present invention has the object to cause linear motion of the plunger output extension 76 in the axial direction by supplying a fluid, such as air or hydraulic fluid, to the single port connection 160B, and have the output extension 76 return to its original position when the fluid pressure is removed and the fluid allowed to exit the port connection 160B, and/or by causing the axial motion by manual turning the handle 180.

The fluid-powered operation of this embodiment of the present invention is exactly the same as in the single-acting embodiment described above. In this embodiment, turning the handle 180 by hand, and the reaction member 24B with it, causes the piston 12B and rotor 14 to rotate with it, causing the plunger 16 to move axially.

The plunger extension 76 can be made such a length that it does not make effective contact with the device being operated by the actuator unless the handle 180 is turned manually in addition delivering fluid pressure to the port 160B, making this embodiment operate as a logical "AND" actuator. Alternately, the plunger extension 76 can be made such that it makes effective contact with the device being operated by the actuator when either the handle 180 is turned manually or fluid pressure is delivered to the port 160B, making this embodiment operate as a logical "OR" actuator.

Movement of the piston 12B during operation with fluid pressure or by means of the spring element 150 exerts torque on the reaction member 24B, so that means must be provided to prevent unintentional rotation of the reaction member 24B with respect to the housing 10B; this is not illustrated in FIGS. 3A through 3C, but could be accomplished with a detent spring holding the handle pin 182 at one end of the slot 172 or the other; an even simpler means would be to position an O-ring between the inside wall of the handle 180 and the outside of the housing 10B, but these and many other options are a matter of user's preference.

CONCLUSION, RAMIFICATIONS, AND SCOPE

From the preceding the reader can see that the present invention achieves its objects of increasing a fluid pressure operated actuator's output thrust without increasing its diameter or the fluid pressure, without the use of incompressible fluids retained within the actuator, and without cam levers or linkages, and does so by combining a compact fluid-powered rotary actuator with a power screw. The reader can also see that compact character of the present invention also achieves the object of combining fluid-power and manual operation in a single compact actuator.

While my above descriptions contain many specificities, these should not be construed as limitations of the scope of the invention, but rather as preferred embodiments thereof. Many variations are possible. For example, the reaction member 24, piston 12, and rotor 14 might engage each other through ball elements captured in helical grooves in the surfaces of all of these members, or for the purposes of this invention any other convenient means of producing rotation of the piston 12 and/or rotor 14 when the piston 12 is impelled to slide axially in the housing 10, and it is not even essential that both the piston 12 rotates with respect to the reaction member 24 and the rotor 14 rotates with respect to the piston 12 as long as there is rotation with respect to at least one pair; in another example, the plunger 16 might have a lengthwise keyway which engages a key held in the base 18, rather than flats 76; for another example, the "Down" and "Up" port connections 122 & 124 need not be located at the closed end of the housing 10 nor deliver their fluids through concentric passages such as formed by the piston tube 50 and port tube 40, and might be located on the sides of the housing 10 or even, in the "Up" port connection's case, in the base 12; the cylindrical wall of the housing 10 could be separate from the closure at the end with the reaction member, and the whole assembly held together by lengthwise tie rods, eliminating the need for a threaded connection between housing 10 and base 18; and whether base mounting threads 90 are preferred or not is wholly dependent on the design of the device to be operated by the actuator, as are the details of the plunger extension. Even the piston tube 50 might be dispensed with in favor of a port tube 112 which passes through the piston 12 all the way to the floor of the rotor 14 and moving the piston port seal 102 to a gland in the closed end of the piston 12. In the example of the embodiment combining manual and fluid pressure operation, the fluid port 160B could be located on the side of the housing 10B or even in the base 18, but it is preferred to place it in the external end of the reaction member 24B to maintain a narrower profile for this actuator; in this position it causes no flexing to the conduit delivering the operating fluid if the port 160B is equipped with a swivel connector, and the conduit would not interfere with use of the handle 180.

The description omits specifying the materials of construction because these, too, are choices subject to the needs of specific applications; for example, if the actuator is to operate in an ultra-clean environment, passivated stainless steel and anodized aluminum might be the materials of choice; service in more hostile environments like bore holes or in aerospace systems might argue for super-alloys with higher strengths at elevated temperatures and greater corrosion resistance; in service where weight is a critical issue, titanium alloys might be best, or even high performance resins like polyimide or polybenzimidizole. Material choice is also affected by available methods of fabrication, which might include metals casting, powder metallurgy, high pressure forming, welding or brazing assemblies from simpler pieces, or machining processes like cutting, grinding, electro-discharge machining, or abrasive jet machining.

Accordingly, the scope of the present invention should be determined not by the embodiments illustrated, but by the appended claims and their legal equivalents.

What is claimed is:

1. A double-acting fluid-powered linear actuator comprising:

a. a pneumatic or hydraulic rotary actuator coupled with a power screw, b. said rotary actuator comprised of a housing in the form of a cylinder closed at one end with a cylindrical reaction member affixed coaxially inside one end, a piston in the form of a cylinder closed at one end and which fits within said housing such that it divides the interior of said housing into two volumes and such that said piston may rotate and move axially in said housing and partially covers said reaction member, a means producing rotation of said piston with respect to said reaction member when said piston moves axially with respect to said reaction member, a rotor in the form of a cylinder closed at one end and which fits within said housing such that it may rotate but not move axially and partially covers said piston, a means producing rotation of said rotor with respect to said piston when said piston moves axially into said rotor, a pair of ports through which fluid may be delivered alternately to the volume within said housing between said reaction member and said piston and to the volume within said housing remote from said reaction member, such that fluid pressure applied to one port results in said piston both moving axially in one direction and rotating in one direction with respect to said reaction member and said rotor turning in one direction, and fluid pressure applied to the other port results in said piston moving axially in the other direction and turning in the other direction with respect to said reaction member and said rotor turning in the other direction with respect to said piston, c. said power screw comprised of a plunger with screw threads at one end which engage screw threads in the closed face of said rotor, a means guiding said plunger in axial motion, a means restraining said plunger from rotating.

2. A single-acting fluid-powered linear actuator comprising:

a. a pneumatic or hydraulic rotary actuator coupled with a power screw, b. said rotary actuator comprised of a housing in the form of a cylinder closed at one end with a cylindrical reaction member affixed coaxially inside one end, a piston in the form of a cylinder closed at one end and which fits within said housing such that it divides the interior of said housing into two volumes and such that said piston may rotate and move axially in said housing and partially covers said reaction member, a means producing rotation of said piston with respect to said reaction member when said piston moves axially with respect to said reaction member, a rotor in the form of a cylinder closed at one end and which fits within said housing such that it may rotate but not move axially and partially covers said piston, a means producing rotation of said rotor with respect to said piston when said piston moves axially into said rotor, a port through which fluid may be delivered to the volume within said housing between said reaction member and said piston and to the volume within said housing excluding said reaction member, such that fluid pressure applied to one port results in said piston both moving axially in one direction and rotating in one direction with respect to said reaction member and said rotor turning in one direction, the means of a spring element attached to said rotor and said housing or attached to said rotor and said piston or attached to said piston and said reaction member causing the reversal of motions of said rotor and said piston when fluid pressure is released from said port, c. said power screw comprised of a plunger with screw threads at one end which engage screw threads in the closed face of said rotor, a means guiding said plunger in axial motion, a means restraining said plunger from rotating.

3. A linear actuator operated by both fluid-power and manual force comprising:

a. a pneumatic or hydraulic and hand operated rotary actuator coupled with a power screw, b. said rotary actuator comprised of a housing in the form of a cylinder closed at one end, a reaction member in the form of a cylinder with a neck at one end, a means of holding and holding said reaction member coaxially inside the closed end of said housing with said neck extruding through said housing such that said reaction member may rotate but not move axially, a handle or lever, a means attaching said handle to the portion of said reaction member exterior to said housing and transmitting torque and rotation from a person's hand to said reaction member, a piston in the form of a cylinder closed at one end and which fits within said housing such that it divides the interior of said housing into two volumes and such that said piston may rotate and move axially in said housing and partially covers said reaction member, a means producing rotation of said piston with respect to said reaction member when said piston moves axially with respect to said reaction member, a rotor in the form of a cylinder closed at one end and which fits within said housing such that it may rotate but not move axially and partially covers said piston, a means producing rotation of said rotor with respect to said piston when said piston moves axially into said rotor, a pair of ports through which fluid may be delivered alternately to the volume within said housing between said reaction member and said piston and to the volume within said housing remote from said reaction member, such that fluid pressure applied to one port results in said piston both moving axially in one direction and rotating in one direction with respect to said reaction member and said rotor turning in one direction, and fluid pressure applied to the other port results in said piston moving axially in the other direction and turning in the other direction with respect to said reaction member and said rotor turning in the other direction with respect to said piston, the means of a spring element attached to said rotor and said housing or attached to said rotor and said piston or attached to said piston and said reaction member causing the reversal of motions of said rotor and said piston when fluid pressure is released from said port when operation of said rotary actuator with a single port is intended, c. said power screw comprised of a plunger with screw threads at one end which engage screw threads in the closed face of said rotor, a means guiding said plunger in axial motion, a means restraining said plunger from rotating.

* * * * *